Figure 1:
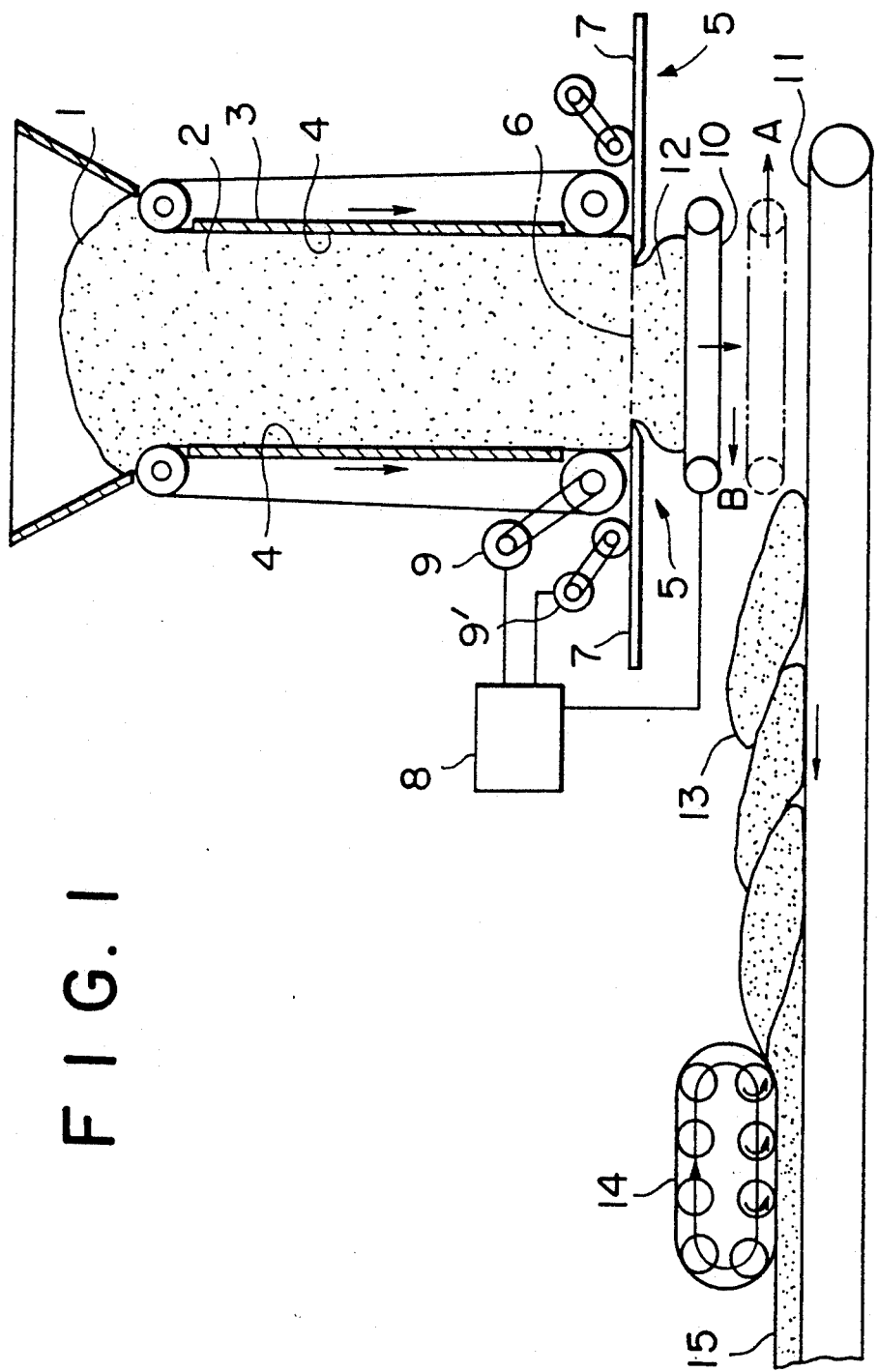

United States Patent [19]

Morikawa et al.

[11] Patent Number: 5,232,713
[45] Date of Patent: Aug. 3, 1993

[54] APPARATUS FOR CONTINUOUSLY DIVIDING BREAD DOUGH

[75] Inventors: Michio Morikawa; Koichi Hirabayashi; Torahiko Hayashi, all of Utsunomiya, Japan

[73] Assignee: Rheon Automatic Machinery Co., Ltd., Utsunomiya, Japan

[21] Appl. No.: 915,480

[22] Filed: Jul. 16, 1992

Related U.S. Application Data

[62] Division of Ser. No. 727,679, Jul. 10, 1991, Pat. No. 5,158,792.

[30] Foreign Application Priority Data

Jul. 13, 1990 [JP] Japan .................................. 2-186766

[51] Int. Cl.[5] .............................................. A21C 9/08
[52] U.S. Cl. .................................. 425/140; 264/40.4; 425/142; 425/148; 425/297; 425/308; 425/315
[58] Field of Search ............... 425/101, 140, 105, 106, 425/287, 80.1, 288, 239, 142, 145, 148, 296, 297, 373, 308, 315; 426/503; 264/40.4

[56] References Cited

U.S. PATENT DOCUMENTS

| | | | |
|---|---|---|---|
| 1,692,860 | 11/1928 | Petri | 425/101 |
| 2,571,334 | 10/1951 | Browne | 425/80.1 |
| 2,779,298 | 1/1957 | Chwirut et al. | 425/288 |
| 4,056,346 | 11/1979 | Hayashi | 425/101 |
| 4,420,299 | 12/1983 | De Mets | 425/101 |
| 4,515,542 | 5/1985 | Peschetz | 425/101 |
| 4,883,417 | 11/1989 | Morikawa et al. | 425/140 |

FOREIGN PATENT DOCUMENTS

2819512  11/1978  Fed. Rep. of Germany ...... 425/239

Primary Examiner—Jay H. Woo
Assistant Examiner—Joseph Leyson
Attorney, Agent, or Firm—Guy W. Shoup; Patrick T. Bever

[57] ABSTRACT

An apparatus is disclosed for continuously dividing bread dough. The apparatus consists of a dough hopper, vertical conveyors mounted on the side walls of the hopper, a dough outlet provided at the bottom of the hopper located under the vertical conveyors, a divider having cutting knives for dividing the dough, a weighing conveyor provided under the divider for weighing the dough discharged through the weighing conveyor, and a control means for controlling the timing in the discharging operation of the weighing conveyor according to the weight of the dough. The weight of the divided dough is instantly and successively weighed, while the period to keep the outlet open is controlled so that a belt-like sheet of dough, with sections of a uniform weight, is continuously produced.

2 Claims, 3 Drawing Sheets

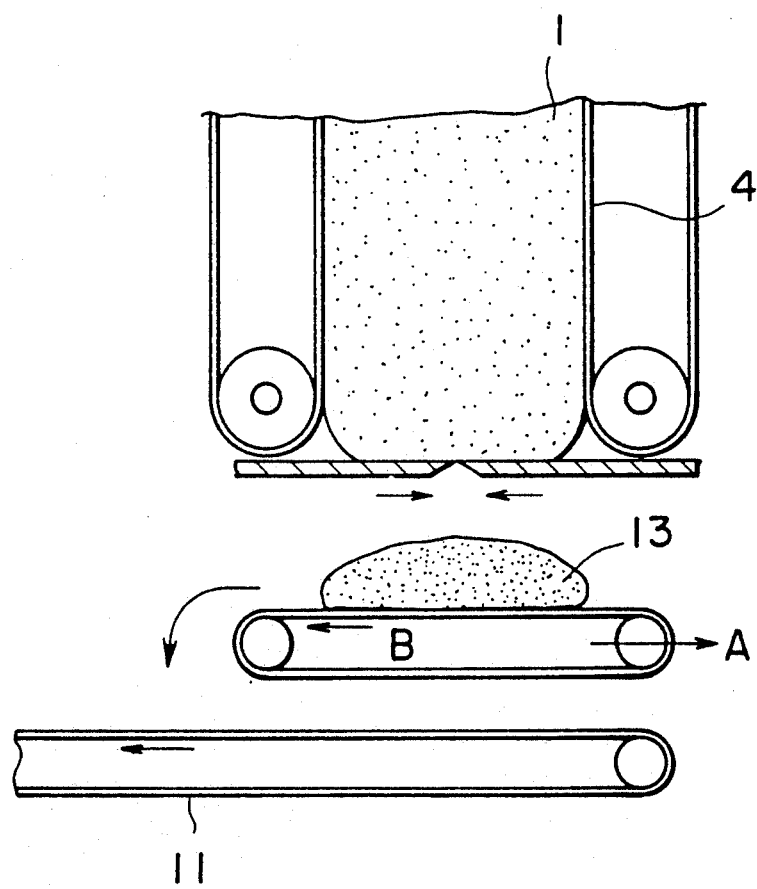

APPARATUS FOR CONTINUOUSLY DIVIDING BREAD DOUGH

This application is a division of U.S. Ser. No. 07/727,679, filed Jul. 10, 1991, now U.S. Pat. No. 5,158,792.

FIELD OF THE INVENTION

This invention relates to an apparatus for dividing dough, and more particularly, for continuously dividing bread dough into pieces of equal weight.

PRIOR ART

In a conventional bread production process materials are mixed and kneaded in a mixer to prepare a mass of dough, the dough is first divided through a divider into small pieces having a preset weight value and then moved to their respective molding processes. In this dividing process, a small part of the dough is sucked into a cylinder by means of a piston of the divider to measure its volume. This dividing process complicates its subsequent processes in that the gel structure of the dough is destroyed by the mechanical stresses exerted on it through the movements of the piston or the like. To avoid this an oxidizing agent such as potassium bromate has to be mixed in advance into the dough, and a resting step is needed after the dividing process to intermediately rest the divided dough for a certain period.

Further, this known method, where the volume of the dough is measured by means of a measuring cylinder, is not appropriate for dividing dough bread into pieces of a constant weight. This is because the specific gravity of the dough is always changing due to the generation of gases in it. Thus, inconveniences accompanied by the variations in the measurements of the weight of the dough have remained.

SUMMARY OF THE INVENTION

An object of the present invention, therefore, is to provide an improved dough dividing method and apparatus for producing a sheet of dough without damaging the gel structure of the dough.

Another object of the present invention is to provide a method and apparatus for continuously dividing bread dough wherein an improved dough divider is provided.

A further object of the present invention is to provide a method and apparatus for continuously dividing bread dough so as to produce a sheet of dough with every section of uniform weight.

The foregoing and other problems of the prior art methods have been overcome by the present invention. According to the present invention, an apparatus is provided for producing a continuous mass of dough,- comprising vertical conveyors mounted on at least two opposing side walls of a dough hopper and a divider for opening and closing an outlet provided at the bottom of the hopper so as to divide the dough passing down the outlet. In the apparatus of the above structure the damage to the gel structure in the dough is reduced in that the downward movements of the dough, assisted by the vertical conveyors, eliminate friction between the dough and the side walls, wherein the conveyors are always operated or intermittently operated only when the outlet is open. The fact that at any level in the hopper an equal or approximately equal horizontal cross-sectional area of space is provided, defined by the facing side walls, serves to reduce the generation of the shearing stresses in the dough when it passes down and through the hopper. Thus, throughout the feeding and dividing process the apparatus enables a mass of dough free of damage to the gel structure to be freely discharged through the outlet, while the uniform weight of the discharged mass of dough at any section thereof is always maintained by instantly compensating for any variation in volume at the time of discharge.

In one aspect of the present invention the method comprises measuring the weight of the piece of dough immediately after the dough has been divided, obtaining the ratio of the standard for the weight of dough to be divided to the above-measured weight, and by the use of the ratio determining the length of the next period to keep the outlet open.

In another aspect of the present invention, the method comprises receiving the dough discharged through the outlet onto the weighing stand so as to continuously measure its weight until it is divided and controlling the movements of the knives so that the weight of any divided piece of dough is the same as the preceding piece obtained.

In a further aspect of the present invention, the method comprises receiving the dough discharged through the outlet onto the weighing stand to measure the weight of the dough, downwardly and rearwardly moving the stand during the dividing operation or after the completion of the dividing operation, while the dough is being weighed, the dough being transferred from the weighing stand onto a conveyor so as to be disposed at intervals proportional to the respective weight of each piece of dough, an then stretching the dough to form a continuous belt-like sheet of dough with every section of uniform weight.

These and other objects and features of the present invention will become readily understood after the drawings and the following detailed descriptions of the preferred embodiments of the present invention are seen and read.

BRIEF DESCRIPTIONS OF THE DRAWINGS

FIG. 1 is a schematic cross-sectional side view showing an embodiment of this invention.

Figure 2:
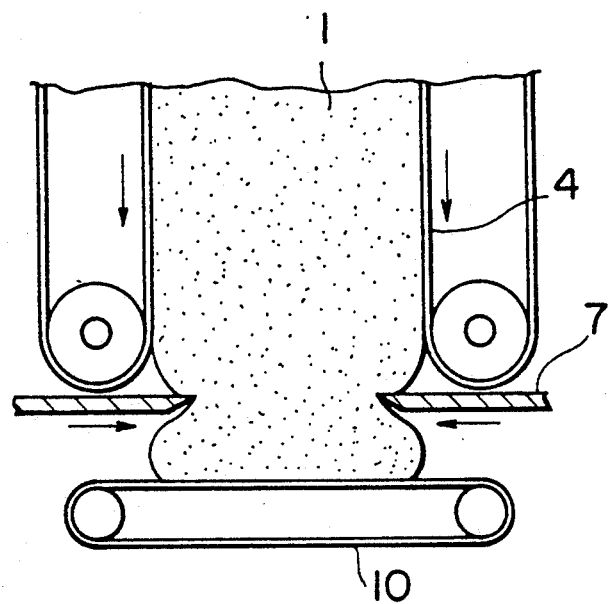
Figure 3:
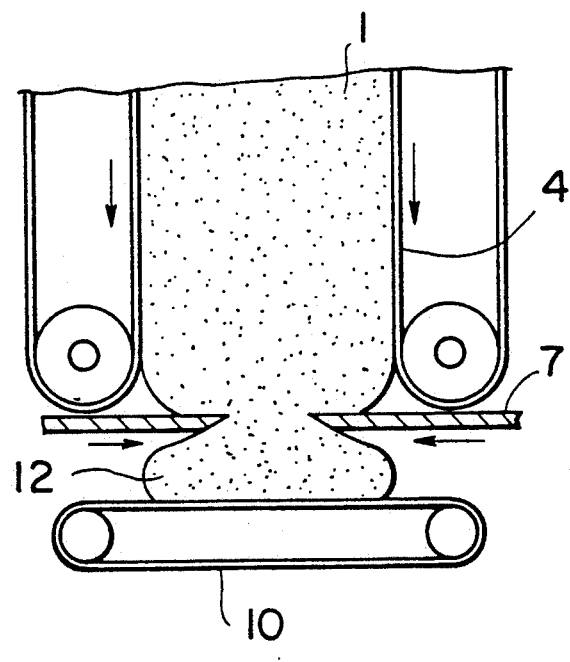

FIGS. 2, 3, and 4 are schematic, stepwise, and partial side views, showing the operation of the embodiment.

THE PREFERRED EMBODIMENTS

Referring to FIG. 1, a hopper 2 for dough 1 consists of an upwardly enlarged open top section for receiving dough 1 and the main body section formed with surrounding side walls 3. The horizontal cross-sectional area of the space surrounded by the walls 3 is kept constant at any level in the inside of the hopper.

Vertical conveyors 4 are mounted on the two side walls 3 facing each other. It is also possible, and even preferable, to mount vertical conveyors 4 on all side walls surrounding the interior of the hopper. Each vertical conveyor consists of a driven roller at the bottom and a freely rotatable roller at the top. The driven roller is driven by means of a motor 9, which is connected to the roller by a conventional means. Both rollers supporting a conveyor belt pass around them, the flight of the conveyor belt facing the inner side of the hopper being supported by a support plate. The vertical conveyors move the dough 1 in the hopper down to an outlet 6 without generating any friction between the walls 3 and the dough 1.

A divider 5, equipped with cutting knives 7, is provided at the outlet 6 located under the vertical conveyors 4 so as to divide, by the sliding movements of the knives 7, the dough 12 discharged through the outlet 6. The knives 7 are arranged to move forward and away from each other by means of a control motor 9', the output of which is connected to the knives by means of a conventional mechanism.

Thus, the outlet 6 is opened and closed by the sliding movements of the knives 7 mounted on the divider 5. When the knives 7 are in the abutting position, the outlet 6 is closed.

A weighing and discharging conveyor 10 for measuring the weight of the dough and discharging it is provided under the divider 5. The conveyor consists of a conveyor belt passing around two horizontal rollers that are spaced apart from each other, one of which rollers is driven. In the weighing operation the weight of the dough is calculated by measuring the total weight of the conveyor carrying the dough sensed by means of a weighing device such as a load cell mounted on a base (not shown) that supports the conveyor 10, and then subtracting the net weight of the conveyor from the measurement. The conveyor is supported by a frame (not shown) in such a manner that it is movable in both the vertical and horizontal directions.

The values of the calculated weight of the dough are fed to a control means 8 and stored in it. The control means 8 adjusts, by means of control motors 9 and 9', the operation of the vertical conveyors 4 and the period for the divider 5 to keep the knives 7 separated, respectively. The control means 8 also adjusts the operation of the weighing and discharging conveyor 10 so that the timing for the conveyor 10 to be moved up and down, or to the rear and forward, is appropriately determined. For the purposes of the above-mentioned control the weighing and discharging conveyor 10 can be operated by any conventional means.

A transfer conveyor 11 is provided under the weighing and discharging conveyor 10 for conveying the dough received from the weighing and discharging conveyor 10. FIG. 1 shows only a part of the conveyor 11, which includes an end positioned under the weighing and discharging conveyor 10. The transfer conveyor consists of a conveyor belt passing around two rollers. Only one of them is shown. One of the rollers is driven by means (not shown).

The operation of the present invention will now be explained by also referring to FIGS. 2, 3, and 4. The hopper 2 is filled with dough 1 when the knives 7 are closed. In this state, when the knives 7 are separated, the outlet 6 is opened, and the dough is discharged through the outlet onto the weighing and discharging conveyor 10. Since the dough is supported by the conveyor 10 during the discharge, the dough accumulates on the conveyor 10 without being accelerated.

When a preset amount of dough accumulates, the knives 7 are closed by a command from the control means 8. The dividing operation is helped by the simultaneous downward movement of the weighing and discharging conveyor 10.

The weighing operation starts when the dough begins to be discharged onto the weighing and discharging conveyor 10, and continues until the dough is cut. The measurements are continuously recorded throughout the weighing operation.

The information containing the weight of the dough and the period during which the outlet is open is fed to the control means 8, and used to determine the length of the next period to keep the outlet open.

The period to keep the outlet open is determined in the control means 8 as follows: first the standard weight A of a piece of dough to be divided is preset, and the period D needed for obtaining this standard weight A is calculated according to the following equation:

$$A/D = B/C$$

where B is the weight of a piece of dough measured after the dough has been divided, and C is the period needed for keeping the outlet open to discharge the dough of the weight B. Thus, an appropriate period to keep the outlet 6 open is always estimated in line with the changing dough-processing conditions.

This calculation of the the length of the period to keep the outlet open is advantageous in that by so doing inaccurate measurements due to the unstable flow of the dough caused by the rheological properties of the dough in the hopper, unpredictable changes in the specific gravity of the dough due to the gas generated in the dough, or changes in the pressure at the outlet or resistance to a smooth flow downward due to the increase or decrease of the height of dough in the hopper, can all be avoided.

In another method of dividing dough, the dough is divided without recourse to the calculated values according to the above equation. In this direct method, dough is divided immediately after the dough being accummulated on the weighing and discharging conveyor 10 is weighed.

The divided dough 13 with a constant weight is thus placed on the weighing and discharging conveyor 10. Then, the whole weighing and discharging conveyor 10 is moved in the direction shown by the arrow A in FIG. 4, and the conveyor belt is driven to be advanced in the direction shown by the arrow B. These movements are controlled by the control means 8 so that at a preset position on the transfer conveyor 11 the tip of the divided dough overlaps the preceding section of the divided dough. The transferred pieces of dough arranged in the above-mentioned way on the transfer conveyor 11 are stretched by means of any conventional stretcher 14. Therefore, a continuous belt-like sheet of dough 15, with every section of a uniform weight, can be produced.

The continuous sheet of dough 15 is cut into preset dimensions so as to be treated in a subsequent molding process.

THE EFFECTS OF THE INVENTION

As is explained above, by providing the divider, the dividing and weighing conveyor, and the transfer conveyor, which are all instantly and successively controllable through the control means, the method and apparatus of this invention can be adaptable to ever-changing dough-processing conditions, to continuously divide bread dough so as to produce dough masses of a uniform weight. By transferring them onto a subsequent processing station a high-quality belt-like sheet of dough, with sections of a uniform weight, is obtained. This can be accomplished without needing the extra chemical agents and processes that were inevitable with the prior art methods, while the gel structure of the dough can be kept undamaged.

We claim:

1. An apparatus for continuously dividing bread dough, comprising
   a dough hopper,
   vertical conveyors mounted on opposing side walls of the hopper,
   a dough outlet provided at the bottom of the hopper located under the vertical conveyors,
   a divider located below the dough outlet, said divider having cutting knives for dividing the dough into dough pieces,
   a weighing conveyor located under the divider for weighing and discharging the dough pieces, and
   means for controlling the divider and the weighing conveyor such that the time period D for opening the divider for a first dough piece having a preset first weight A is calculated according to the equation $B/C = A/D$, where C is the amount of time the divider was opened for a previously-divided second dough piece having a weight B.

2. An apparatus of claim 1 wherein the controlling means controls movement of the weighing conveyor to arrange the dough portions onto a transfer conveyor at intervals proportional to their respective weights, and wherein the apparatus further comprises means for stretching the arranged dough pieces to form a continuous belt-like sheet of dough on said transfer conveyor.

* * * * *